US012246338B2

(12) United States Patent
Tomassoni

(10) Patent No.: US 12,246,338 B2
(45) Date of Patent: Mar. 11, 2025

(54) APPARATUS FOR COATING OBJECTS WITH A POWDER COATING AND FOR SPEEDING A COLOR CHANGE PHASE

(71) Applicant: SIVER S.R.L., Corciano-Frazione Taverne (IT)

(72) Inventor: Luca Tomassoni, Corciano (IT)

(73) Assignee: Siver S.r.l., Frazione Taverne (IT)

( * ) Notice: Subject to any disclaimer, the term of this patent is extended or adjusted under 35 U.S.C. 154(b) by 682 days.

(21) Appl. No.: 16/766,261

(22) PCT Filed: Nov. 21, 2018

(86) PCT No.: PCT/IB2018/059175
§ 371 (c)(1),
(2) Date: May 21, 2020

(87) PCT Pub. No.: WO2019/102370
PCT Pub. Date: May 31, 2019

(65) Prior Publication Data

US 2020/0368767 A1 Nov. 26, 2020

(30) Foreign Application Priority Data

Nov. 21, 2017 (IT) ........................ 102017000133462

(51) Int. Cl.
*B05B 7/14* (2006.01)
*B05B 12/14* (2006.01)

(52) U.S. Cl.
CPC .......... *B05B 7/1468* (2013.01); *B05B 7/1404* (2013.01); *B05B 12/149* (2013.01)

(58) Field of Classification Search
CPC .... B05B 12/149; B05B 7/1468; B05B 7/1459
USPC .......................................................... 222/135
See application file for complete search history.

(56) References Cited

U.S. PATENT DOCUMENTS 3,450,092 A * 6/1969 Kock ........................ B05B 5/16 118/302
3,674,205 A * 7/1972 Kock ...................... B05B 12/14 137/240
4,728,034 A * 3/1988 Matsumura ............... B05B 5/16 239/112

(Continued)

FOREIGN PATENT DOCUMENTS

EP 2361691 A1 8/2011

*Primary Examiner* — Karl Kurple
(74) *Attorney, Agent, or Firm* — David B. Tingey; K. Russell Griggs; Kirton McConkie

(57) ABSTRACT

The apparatus for coating systems comprises: a first feeding unit provided with first loading and unloading means of a first coating powder; a second feeding unit provided with second loading and unloading means of a second coating powder; a pump assembly associated with a spraying system for sending the first powder and the second powder into a coating booth; connecting means of the pump assembly to the first feeding unit and to the second feeding unit, variable between: a first configuration, in which the pump assembly is operatively connected to the first feeding unit for sending the first powder into the booth; and a second configuration, in which the pump assembly is operatively connected to the second feeding unit for sending the second powder into said booth.

9 Claims, 6 Drawing Sheets

(56) References Cited

U.S. PATENT DOCUMENTS

| | | | | |
|---|---|---|---|---|
| 4,792,092 | A * | 12/1988 | Elberson | B05B 12/14 239/3 |
| 6,695,220 | B2 * | 2/2004 | Vollmer | B05B 7/1404 239/311 |
| 6,705,545 | B1 * | 3/2004 | Sroka | B05B 12/14 239/311 |
| 7,150,585 | B2 * | 12/2006 | Kleineidam | B05B 7/1459 406/146 |
| 8,132,743 | B2 * | 3/2012 | Fulkerson | B05B 15/52 118/313 |
| 8,567,341 | B1 | 10/2013 | Thies | |
| 9,067,223 | B2 * | 6/2015 | Fulkerson | B05B 12/14 |
| 9,657,740 | B2 * | 5/2017 | Mauchle | B05B 7/1404 |
| 9,707,585 | B2 * | 7/2017 | Reimert | B05B 12/149 |
| 10,058,884 | B2 * | 8/2018 | Fulkerson | B05B 12/14 |
| 2004/0060510 | A1 | 4/2004 | Ciarelli et al. | |
| 2005/0279860 | A1 | 12/2005 | Fulkerson et al. | |
| 2013/0094912 | A1 * | 4/2013 | Mauchle | B05B 14/45 406/122 |
| 2015/0224522 | A1 * | 8/2015 | Fulkerson | B05B 1/3093 118/308 |
| 2017/0173610 | A1 * | 6/2017 | Altin | B05B 12/081 |

* cited by examiner

APPARATUS FOR COATING OBJECTS WITH A POWDER COATING AND FOR SPEEDING A COLOR CHANGE PHASE

TECHNICAL FIELD

The present invention relates to an apparatus for coating systems.

BACKGROUND ART

To coat manufactured articles, the need is known to simplify and automate the color change phases in order to save time and therefore increase production output and lower the production costs of the manufactured article.

Machines exist that can be inserted into coating plants and provide for feeding units equipped with powder loading and unloading means which are connected to a spraying system operating in a coating booth.

The feeding units have box-shaped bodies wherein coating powder is conveyed taken from feeding boxes by means of the loading and unloading means.

The box-shaped body is operationally connected to a pump assembly adapted to pick up the powder inside it to feed the spraying system.

During the color change phase, the loading and unloading means empty the box-shaped body, enabling the residual powder to come out.

An operator replaces the box with another box containing another type of powder and starts a new spraying system feeding cycle.

These operations take about 5-10 minutes to unload the residual powder from the box-shaped body and load the new powder into it.

Note that the above-described known apparatus cuts the color change phase times compared to the traditional manual loading and unloading operation and reduces the activities to be performed by the operator.

The need however remains to reduce the time needed to change the color, as well as the need to reduce the incidence of manual work in this work phase.

DESCRIPTION OF THE INVENTION

The main aim of the present invention is to provide an apparatus for coating systems which permits speeding up the color change phase.

One object of the present invention is to provide an apparatus for coating systems that permits reducing the incidence of manual work on the color change.

Another object of the present invention is to provide an apparatus for coating systems which allows overcoming the aforementioned drawbacks of the prior art within the scope of a simple, rational, easy, efficient to use and cost-effective solution.

The aforementioned objects are achieved by the present apparatus for coating systems having the characteristics of claim 1.

BRIEF DESCRIPTION OF THE DRAWINGS

Other characteristics and advantages of the present invention will become more evident from the description of a preferred, but not exclusive embodiment of an apparatus for coating systems, illustrated by way of an indicative, but non-limiting example, in the attached drawings in which.

EMBODIMENTS OF THE INVENTION

Figure 1:
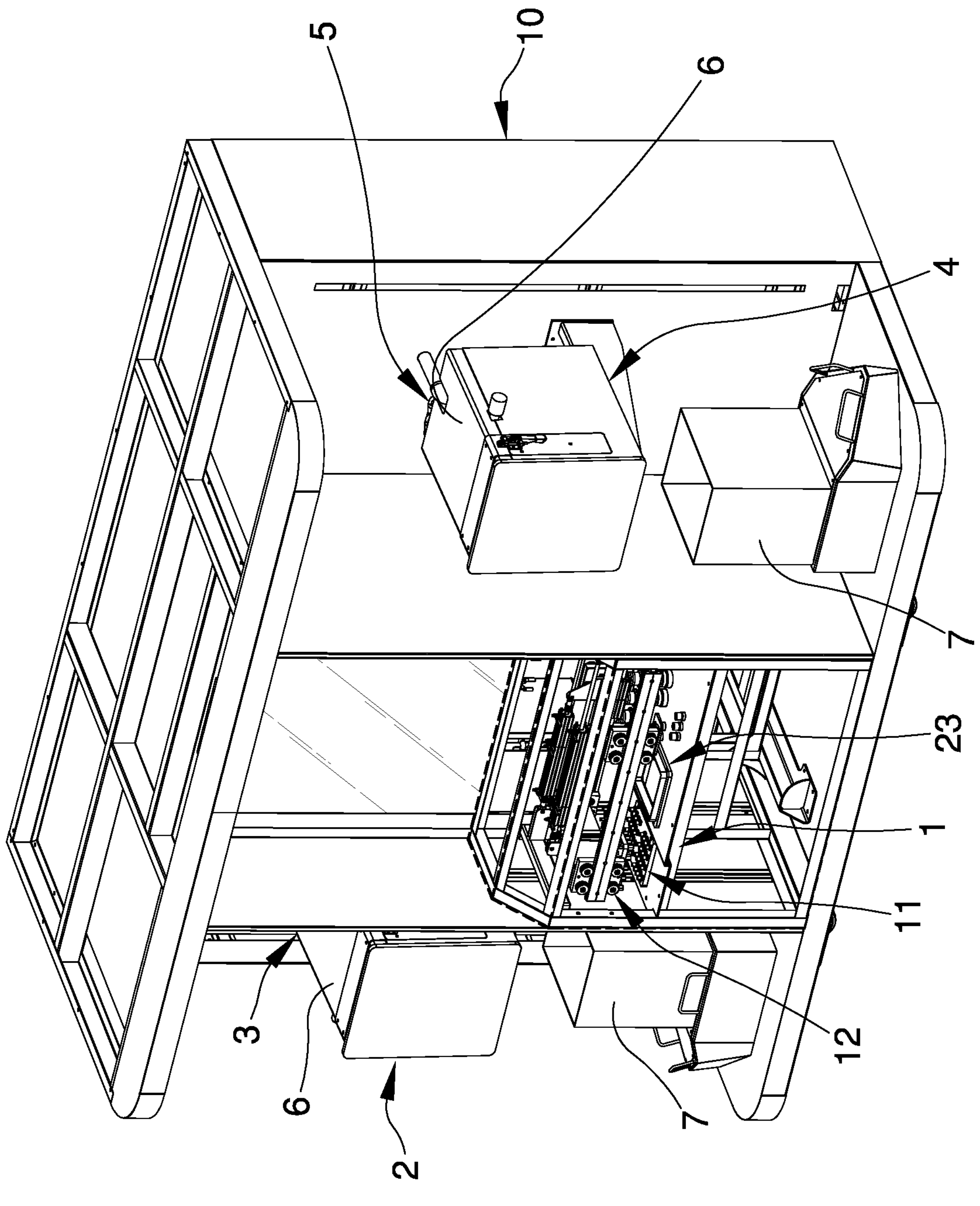
FIG. 1 is an axonometric view of the apparatus according to the invention.
Figure 2:
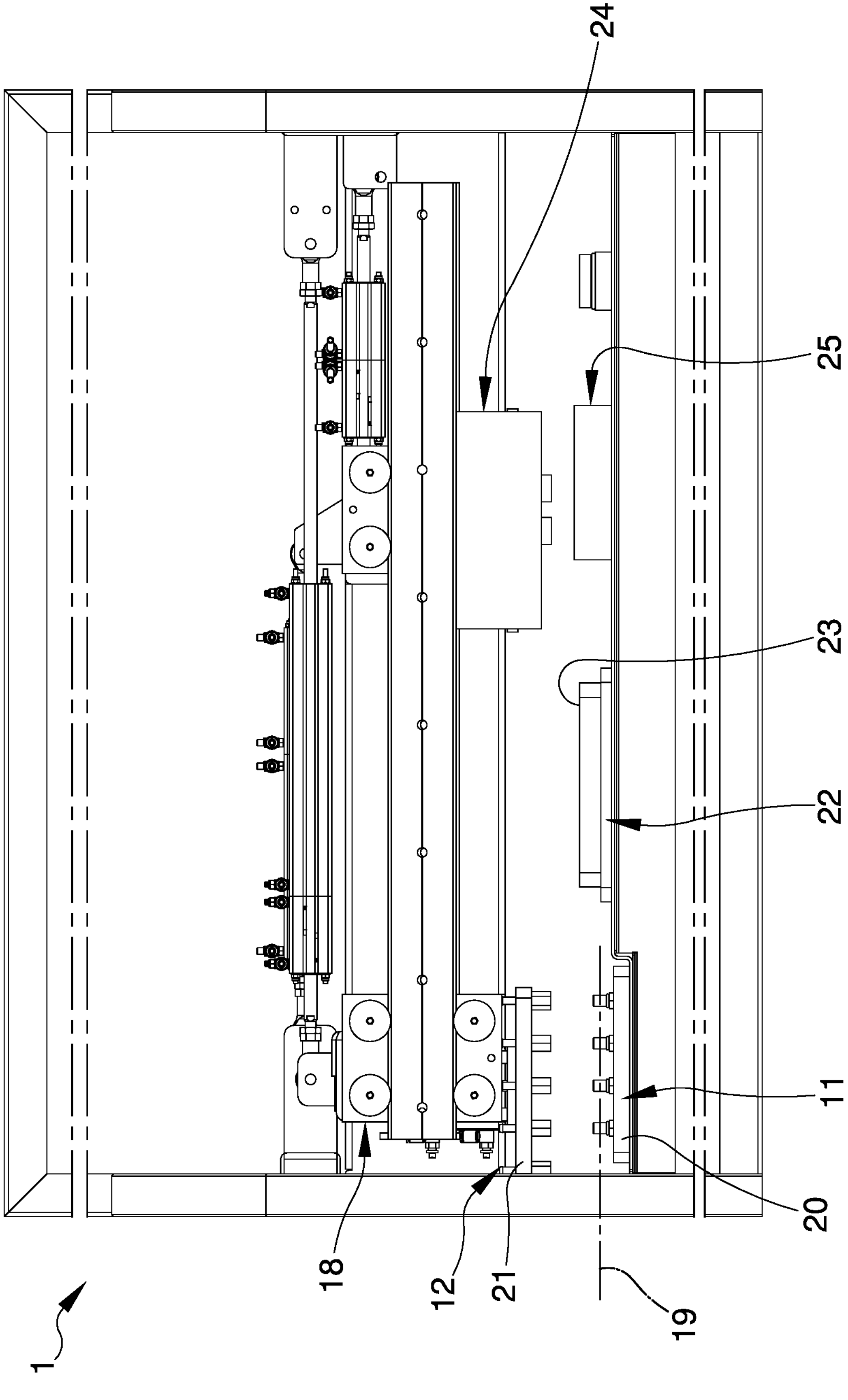
FIG. 2 is a front view of a detail of the apparatus according to the invention.

With particular reference to these figures, reference numeral 1 globally indicates an apparatus for coating systems.

In a first embodiment, according to the invention, the apparatus 1 comprises a first feeding unit 2, provided with first loading and unloading means 3 of a first coating powder, and a second feeding unit 4 provided with second loading and unloading means 5 of a second coating powder.

In the present embodiment, the first feeding unit 2 and the second feeding unit 4 are of the same type and have a box-shaped body 6 which can be filled with the respective coating powders coming from selected feeding boxes 7.

The loading and unloading means 3, 5, schematically shown in the illustrations, comprise pumping devices which are able to create a vacuum or a pressure inside the respective feeding unit 2, 4 in order to transfer the coating powder from the feeding box 7 to the box-shaped body 6 and vice versa.

The apparatus 1 also comprises a pump assembly 8 associated with a spraying system 9 for sending the first powder and the second powder into a coating booth 10.

Figure 3:
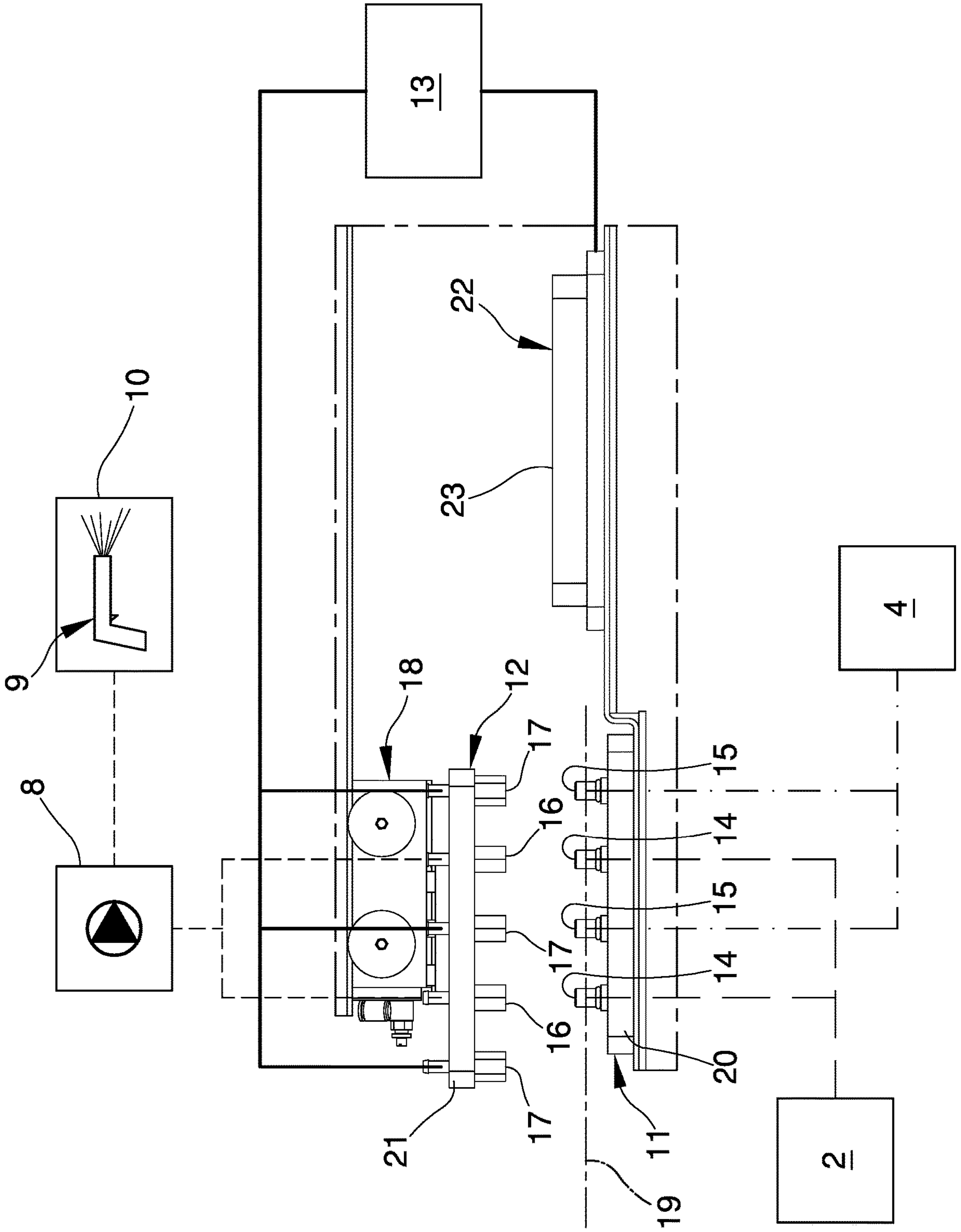
FIG. 3 is a schematic view of the apparatus according to the invention.
Figure 5:
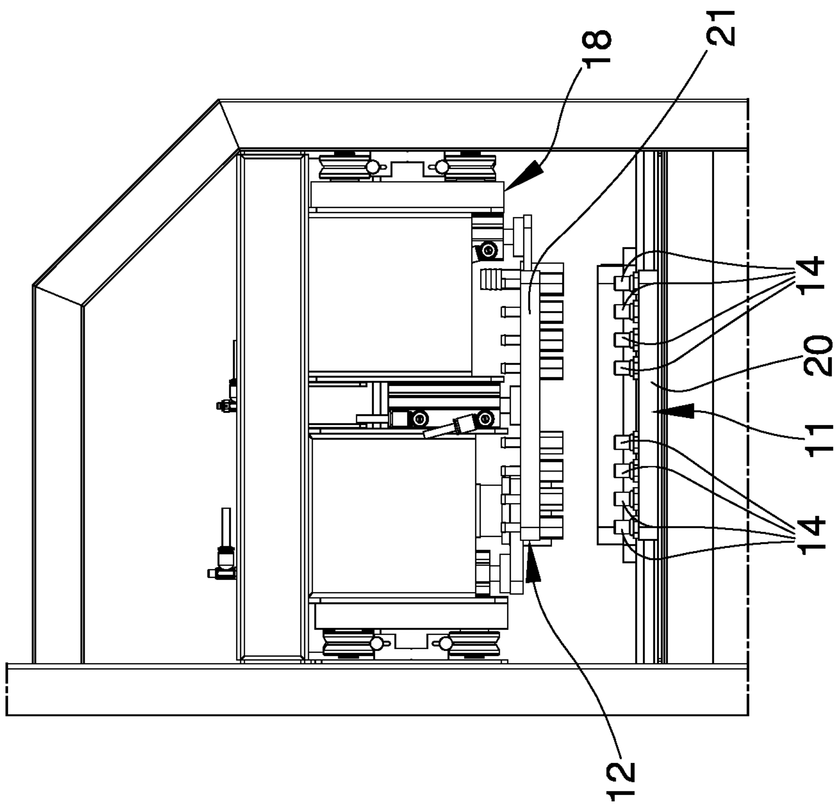
FIG. 5 is a side sectional view of a detail of the apparatus according to the invention.
Figure 4:
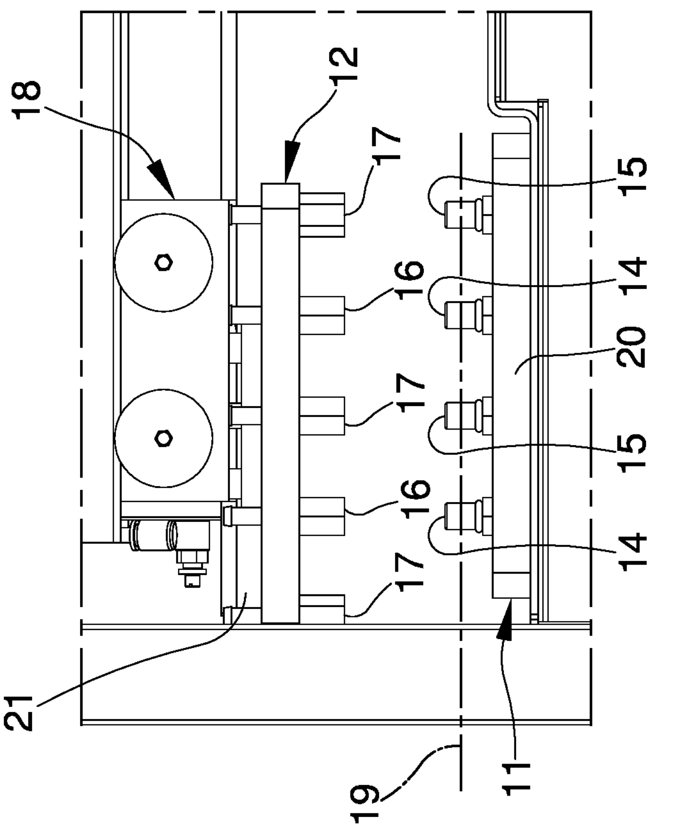
FIG. 4 is a front sectional view of a detail of the apparatus according to the invention.

The spraying system 9 and the coating booth 10 are schematically illustrated in FIG. 3.

In the present embodiment, the pump assembly 8 comprises a self-cleaning pump in the dense phase, able to both suck up the powder from the feeding unit and convey it under pressure to the spraying system 9, and to convey a flow of pressurized air in the direction of origin of the powder.

Alternative solutions cannot be ruled out in which the pump assembly 8 comprises several pumps in the dense phase, or in which the pump assembly comprises pumps of different type, e.g. of the Venturi type.

The spraying system 9, illustrated in a simplified way in the present document, comprises ducts and guns communicating with the pump assembly 8, such guns being inserted or insertable inside a coating booth 10 to cover the manufactured products with powder.

Still according to the invention, the apparatus 1 comprises connecting means 11, 12 of the pump assembly 8 to the first feeding unit 2 and to the second feeding unit 4.

The connecting means 11, 12 are variable between a first configuration and a second configuration.

In the first configuration, the pump assembly 8 is operatively connected to the first feeding unit 2 for sending the first powder into the booth 10.

In the second configuration, the pump assembly 8 is operatively connected to the second feeding unit 4 for sending the second powder into the booth 10.

The connecting means 11, 12 comprise a feeding assembly 11 adapted to receive powder from the first feeding unit 2 and from the second feeding unit 4. The connecting means 11, 12 also comprise a connecting assembly 12 connected to the pump assembly 8 and associated with the feeding assembly 11 alternatively:

- in a first configuration for receiving the first powder to be sent to the pump assembly 8;
- in a second configuration for receiving the second powder to be sent to the pump assembly 8.

In the first configuration, the connecting assembly 12 receives the first powder from the first feeding unit 2 and, due to the pump assembly 8, sends it to the spraying system 9.

In the second configuration, the connecting assembly 12 receives the second powder from the second feeding unit 4 and, due to the pump assembly 8, sends it to the spraying system 9.

With reference to the shown embodiment, furthermore, in the first configuration the second feeding unit 4 is connected to an external circuit 13 for the unloading of the residual powder, while in the second configuration it is the first feeding unit 2 which is connected to the external circuit 13.

The external circuit 13 can be a system of ducts adapted to convey the residual powder out of the apparatus 1, for example by sending it to an assembly of filters, or to a recovery unit, or into the atmosphere, without ruling out solutions other than those listed.

Advantageously, the feeding assembly 11 comprises at least a first feeding nozzle 14 communicating with the first feeding unit 2 and at least a second feeding nozzle 15 communicating with the second feeding unit 4.

The connecting assembly 12 comprises at least a connecting nozzle 16 communicating with the pump assembly 8.

Figure 6:
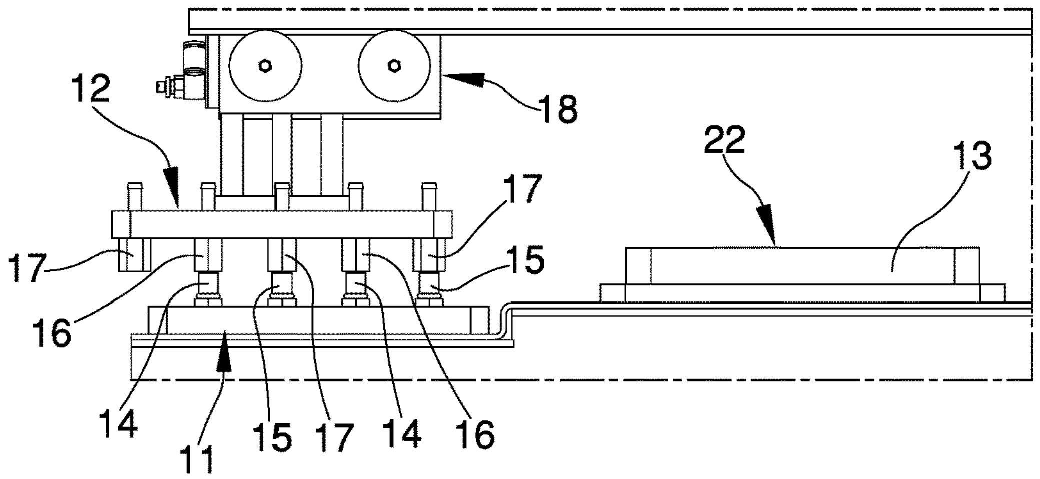
FIG. 6 is a view of a first configuration of the apparatus according to the invention.

In the first configuration (FIG. 6), the connecting nozzle 16 is coupled to the first feeding nozzle 14.

This way the first powder can be sucked by the pump assembly 8 to be sent to the spraying system 9.

Figure 8:
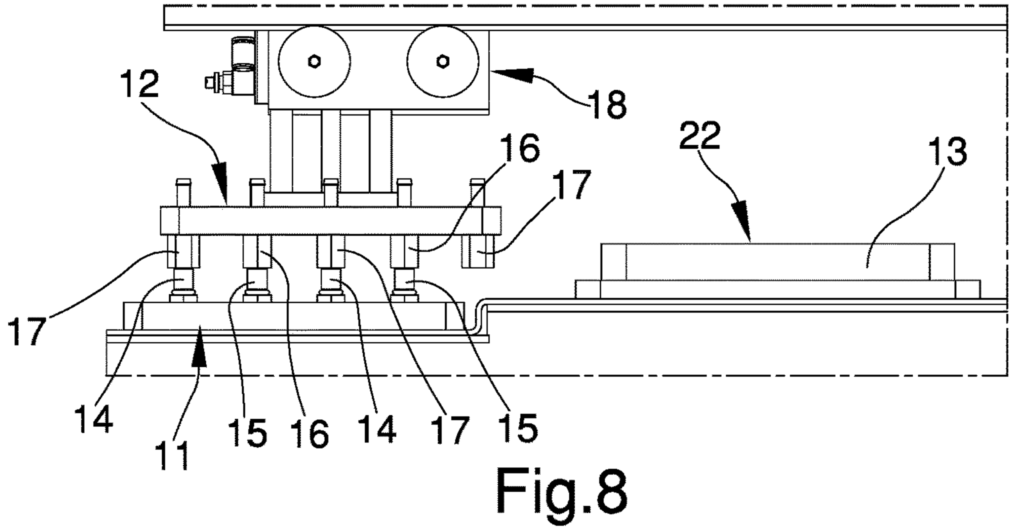
FIG. 8 is a view of a second configuration of the apparatus according to the invention.

In the second configuration (FIG. 8), the connecting nozzle 16 is coupled to the second feeding nozzle 15.

This way it is the second powder which can be sucked by the pump assembly 8 to be sent to the spraying system 9.

Still with reference to the present embodiment, the connecting assembly 12 comprises at least one outlet nozzle 17 communicating with the external circuit 13.

In the first configuration (FIG. 6) the outlet nozzle 17 is coupled to the second feeding nozzle 15.

This way, by pressurizing the second feeding unit 4, the residual powder can flow out of the second feeding nozzle 15 to the external circuit 13.

In the second configuration (FIG. 8) the outlet nozzle 17 is coupled to the first feeding nozzle 14.

This way, by pressurizing the first feeding unit 2, the residual powder can flow out of the first feeding nozzle 14 to the external circuit 13.

These characteristics allow for the cleaning of the second feeding nozzle 15 and of the first feeding nozzle 14.

At least one of the connecting assembly 12 and the feeding assembly 11 is moveable for the switch from the first configuration to the second configuration and vice versa.

The connecting assembly 12 is mounted on a slide 18 sliding along a substantially horizontal direction, and the feeding assembly 11 is fixed.

Furthermore, the connecting assembly 12 can move vertically towards and away from the feeding assembly.

This way the connecting means 11, 12 can switch from the first configuration to the second configuration and vice versa.

Solutions which provide for various possibilities of movement cannot be ruled out, for example in which the feeding assembly 11 moves with respect to the connecting assembly 12, or solutions in which the nozzles change position for coupling in an alternative way.

Different solutions cannot be ruled out which provide for different movement systems as an alternative to the slide 18, e.g. pneumatic systems, telescopic arms, hydraulic actuators, belts and other known solutions.

As shown in the drawings, the apparatus 1 comprises a plurality of first feeding nozzles 14, a plurality of second feeding nozzles 15 and a respective plurality of connecting nozzles 16.

The connecting assembly 12 also comprises a plurality of outlet nozzles 17.

In the first configuration (FIG. 6) the first feeding nozzles 14 are coupled to respective connecting nozzles 16, while the second feeding nozzles 15 are coupled to the outlet nozzles 17.

In the second configuration the second feeding nozzles 15 are coupled to the connecting nozzles 16, while the first feeding nozzles 14 are coupled to the outlet nozzles 17.

Conveniently, the first feeding nozzles 14 and the second feeding nozzles 15 are aligned along a predefined direction 19 and are arranged according to a first nozzle-second nozzle sequence.

The predefined direction 19 is substantially parallel to the horizontal sliding direction.

With reference to FIG. 3, looking from left to right along the predefined direction 19 the nozzles are arranged in a sequence of first feeding nozzle 14, second feeding nozzle 15 and so on.

The feeding assembly 11 comprises a base plate 20 on which the feeding nozzles 14, 15 are arranged.

The feeding nozzles 14, 15 are positioned at a predefined distance the one from the others.

In the present embodiment there are eight rows of alternating sequences of first feeding nozzles 14 and second feeding nozzles 15, each comprising two first feeding nozzles 14 and two second feeding nozzles 15 installed on the base plate 20, but a number of nozzles different to the illustrated one cannot be ruled out.

Similarly, the connecting nozzles 16 and the outlet nozzles 17 are aligned along a direction parallel to the predefined direction 19 and arranged according to an outlet nozzle-connecting nozzle sequence.

The connecting assembly 12 comprises a placement plate 21 on which the connecting nozzles 16 and the outlet nozzles 17 are arranged.

These are arranged in an outlet nozzle-connecting nozzle alternating sequence and positioned the one with respect to the other at the same predefined distance as the feeding nozzles 14, 15.

This way, a movement in the predefined direction 19 is enough to change the coupling of all nozzles.

In particular, there are eight rows of alternating sequences of outlet nozzles 17 and connecting nozzles 16, each comprising three outlet nozzles 17 and two connecting nozzles 16 installed on the placement plate 21, but a number of nozzles different to the illustrated one cannot be ruled out.

The outlet nozzles 17 have one more unit than the connecting nozzles 16 so as to enable all coupling possibilities between nozzles by a simple lateral movement of the connecting assembly 12.

Advantageously, the connecting means 11, 12, between the first configuration and the second configuration, take on a third configuration (FIG. 7) in which the connecting assembly 12 is associated with an outlet assembly 22 for the unloading of residual powder during the switch from the first configuration to the second configuration and vice versa.

Preferably, the outlet assembly 22 is connected to the external circuit 13 in order to convey the residual powder from the connecting nozzles 16 coming out of the apparatus 1.

The outlet assembly 22 comprises a substantially flat unloading portion 23.

The connecting nozzles 16, in the third configuration, are coupled to the unloading portion 23 in order to be able to send the residual powder into the external circuit.

In the illustrated embodiment, the apparatus 1 comprises auxiliary means 24, 25 for recovering the powder sprayed in the booth.

The auxiliary means 24, 25, schematically shown in the illustrations, comprise a recovery portion 24, associated with at least one cyclone or with other recovery elements for the reception of recovered powder present in the coating system. Furthermore, the auxiliary means 24, 25 comprise a sorting portion 25, associable with the recovery portion 24 for the reception of the recovered powder.

The sorting portion 25 is connected to at least one recovery unit intended to receive the recovery powder.

The recovery unit can coincide with the feeding units 2, 4 suitably arranged for a cyclic loading and unloading operation.

Usefully, the apparatus 1 is associated with electronic control means, for simplicity not shown inasmuch as known to the state of the art, adapted to regulate the operation of the moving parts of the apparatus itself, besides regulating the operation of the loading/unloading means and of the pump assembly 8.

This way, an operator can program a work cycle, or configure the loading and unloading procedures, by simply interfacing with the electronic control means. The operation of the present inventions is as follows.

In the first configuration (FIG. 6) the first feeding unit 2, by means of the first loading and unloading means 3, sucks up the first powder from the box 7 and conveys it into the box-shaped body 6.

The connecting assembly 12 moves along a direction parallel to the predefined direction 19 and is positioned on the feeding assembly 11 by coupling the first feeding nozzles 14 to the connecting nozzles 16.

Automatically, when positioning the connecting assembly 12 on the feeding assembly 11, the second feeding nozzles 15 are coupled with the outlet nozzles 17.

The pump assembly 8 is started and the first powder is sucked up by the box-shaped body of the first feeding unit 2 and conveyed to the spraying system 9 by passing through the nozzles 14 and 16 coupled together.

In the first configuration, the second feeding unit 4 is pressurized by the second loading and unloading means 5.

This way, a flow of compressed air is conveyed to the nozzles 15 and any second residual powder from previous processes is blown away.

The second residual powder is conveyed, through the outlet nozzles 17, into the external circuit 13 and used for subsequent disposal or recovery treatments or other subsequent destinations.

Figure 7:
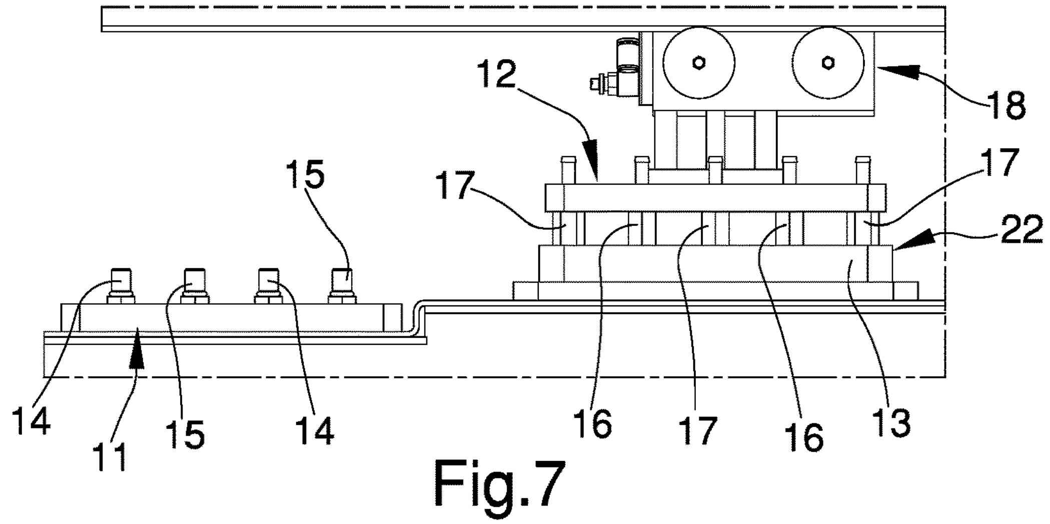
FIG. 7 is a view of a third configuration of the apparatus according to the invention.

The color change provides for the switch from the first configuration (FIG. 6) to the second configuration (FIG. 8), passing first through a third intermediate configuration (FIG. 7).

The connecting assembly 12 lifts from the feeding assembly 11, moves parallel to the predefined direction 19 and moves to the outlet assembly 22, by lowering thereon.

The connecting nozzles 16 are positioned on the unloading portion 23.

The pump assembly 8 varies its operation by sending a flow of compressed air to the connecting assembly 12, blowing away the first powder left in the connecting nozzles 16 following the previous process.

The first residual powder is sent into the unloading portion 23 and conveyed into the external circuit 13.

Subsequently, the connecting assembly 12 lifts again and moves parallel to the predefined direction 19 repositioning itself on the feeding assembly 11.

In the second configuration (FIG. 8), the connecting assembly 12 is positioned in such a way as to couple the connecting nozzles 16 to the second feeding nozzles 15 and the outlet nozzles 17 are coupled to the first feeding nozzles 14. The pump assembly 8 is reactivated in such a way as to suck the second powder from the box-shaped body 6 of the second feeding unit 4 and conveyed to the spraying system 9 passing through the nozzles 15 and 16 coupled to each other.

In the second configuration, the first feeding unit 2 is pressurized by the first loading and unloading means 3.

This way, a flow of compressed air is sent to the nozzles 14 by blowing the first residual powder away from the previous process.

The first residual powder is conveyed, through the outlet nozzles 17, in the external circuit 13 and intended for subsequent disposal or recovery treatments or other subsequent destinations.

This way, the first feeding unit 2, while the spraying system 9 is working with the second powder, is prepared for a further color change which provides, for example, a third powder of a different color from the others already described.

Figure 9:
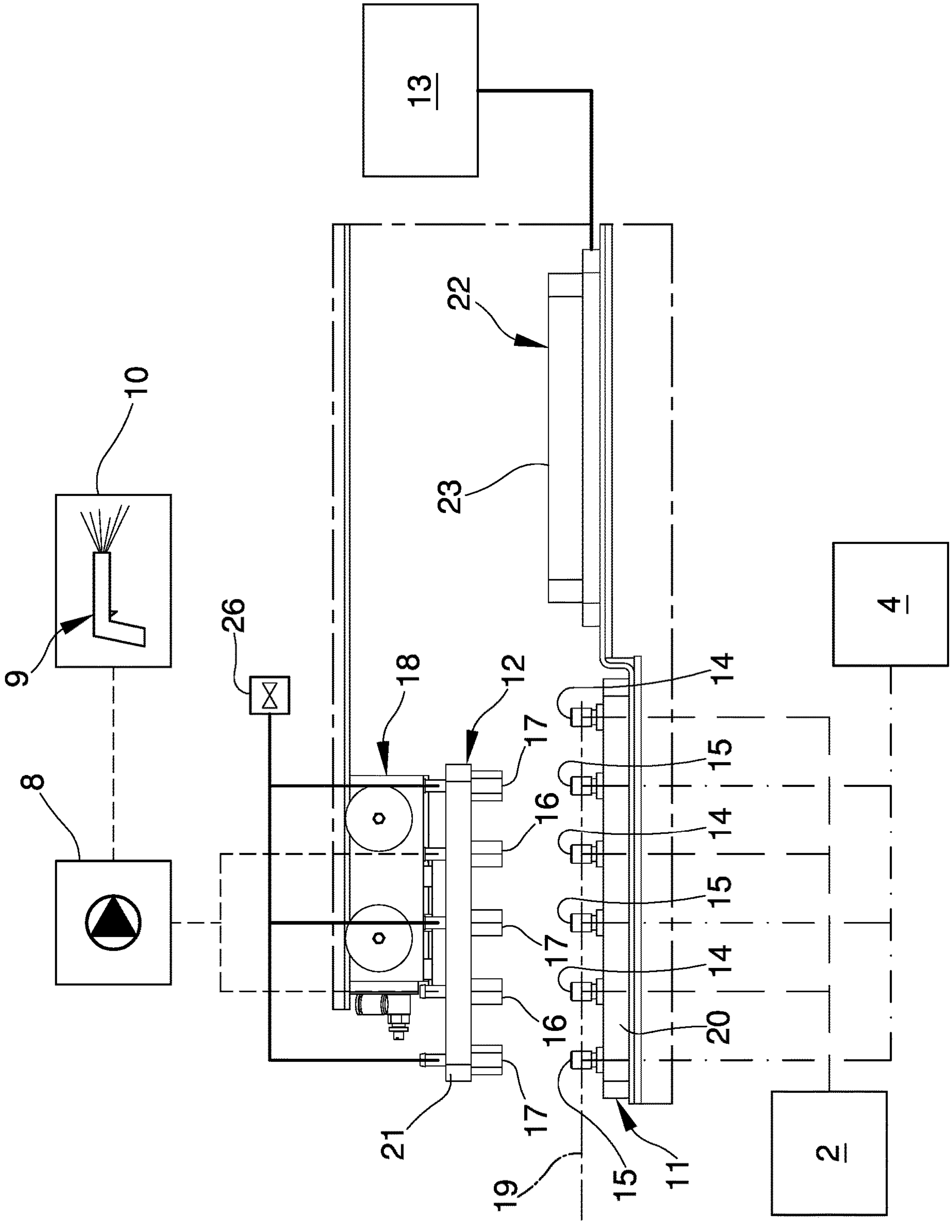
FIG. 9 is a schematic view of a second embodiment of the apparatus according to the invention.

A second embodiment is schematically shown in FIG. 9.

The apparatus 1, in the second embodiment, is completely similar to the first embodiment and is differentiated by the fact that the connecting assembly 12 comprises at least one outlet nozzle 17 communicating with valve means 26 adapted to receive and blow compressed air into the same outlet nozzle 17.

Conveniently, the valve means 26 comprise at least one solenoid valve and are connected to means for the production of compressed air, for the sake of simplicity not shown in the illustrations.

Different solutions cannot be ruled out in which the valve means 26 comprise other types of valve or different compressed air devices.

In the first configuration the outlet nozzle 17 is coupled to the second feeding nozzle 15.

This way a jet of compressed air is insufflated into the feeding nozzle 15 by blowing the residual powder towards the feeding unit 4.

In the second configuration the outlet nozzle 17 is coupled to the first feeding nozzle 14.

This way a jet of compressed air is insufflated into the feeding nozzle 14 by blowing the residual powder towards the feeding unit 2.

These characteristics allow the cleaning of the second feeding nozzle 15 and of the first feeding nozzle 14, by returning the residual powder to the respective feeding units 2 or 4.

The operation of the present invention in the second embodiment is completely similar to that of the first described embodiment with the exception that during the cleaning operations of the nozzles 14, 15 the residual powder is not sent to an external circuit 13, but is sent to the respective feeding units 2, 4.

It has in practice been found that the described invention achieves the intended objects and in particular the fact is underlined that the apparatus for coating systems allows accelerating the color change phase.

Since there are two feeding units coordinated with each other, the time needed to change the color coincides with the time taken by the connecting assembly to move from the first to the third configuration and from the third to the second configuration.

Furthermore, the color change is further speeded up because, while the spraying system works by catching powder from one feeding assembly, the other feeding assembly is prepared to receive more powder.

This way it is possible to carry out a large part of the color change while the plant is working, without interruptions in the coating phase of the manufactured article.

The technical characteristics of the described apparatus, furthermore, make it possible to reduce the incidence of the manual work on the color change, inasmuch as the cleaning and the selective start of the feeding assemblies take place automatically.

The invention claimed is:

1. An apparatus for coating objects, wherein the apparatus comprises:

a first feeding unit provided with a first loading and unloading means of a first coating powder;

a second feeding unit provided with a second loading and unloading means of a second coating powder;

a pump assembly associated with a spraying system for sending said first coating powder and said second coating powder into a coating booth;

a connecting means of said pump assembly to said first feeding unit and to said second feeding unit, variable between:

a first configuration, in which said pump assembly is operatively connected to said first feeding unit for sending said first powder into said coating booth; and a second configuration, in which said pump assembly is operatively connected to said second feeding unit for sending said second powder into said coating booth, wherein in said first configuration, said second feeding unit is connected to an external circuit for an unloading of a residual powder, and wherein in said second configuration, said first feeding unit is connected to said external circuit;

wherein the connecting means comprise a feeding assembly adapted to receive the first coating powder from said first feeding unit and the second coating powder from said second feeding unit, and a connecting assembly connected to said pump assembly and associated with said feeding assembly alternatively:

in the first configuration for receiving said first coating powder to be sent to said pump assembly; and in the second configuration for receiving said second coating powder to be sent to said pump assembly, wherein said feeding assembly comprises a first feeding nozzle communicating with said first feeding unit and a second feeding nozzle communicating with said second feeding unit, wherein said connecting assembly comprises one or more connecting nozzles communicating with said pump assembly, in said first configuration at least one of the one or more connecting nozzles being coupled to said first feeding nozzle and in said second configuration at least one of the one or more connecting nozzles being coupled to said second feeding nozzle, wherein at least one of the connecting assembly and the feeding assembly is moveable for the switch from the first configuration to the second configuration and vice versa, wherein said connecting assembly comprises one or more outlet nozzles nozzle communicating with said external circuit, in said first configuration at least one of said one or more outlet nozzles being coupled to said second feeding nozzle and in said second configuration at least one of said one or more outlet nozzles being coupled to said first feeding nozzle, wherein the feeding assembly comprises a base plate on which the feeding nozzles are arranged, wherein the connecting assembly comprises a placement plate on which the connecting nozzles and the outlet nozzles are arranged, and wherein at least one of the connecting assembly and the feeding assembly is mounted on a slide sliding along a substantially horizontal direction, such that the connecting means can switch from the first configuration to the second configuration and vice versa.

2. The apparatus according to claim 1, wherein the outlet nozzle communicates with valve means adapted to receive and blow compressed air into said outlet nozzle, in said first configuration said outlet nozzle being coupled to said second feeding nozzle and in said second configuration said connecting nozzle being coupled to said first feeding nozzle.

3. The apparatus according to claim 1, wherein the apparatus comprises a plurality of said first feeding nozzles, a plurality of said second feeding nozzles, and a respective plurality of said connecting nozzles.

4. The apparatus according to claim 3, wherein said plurality of said first feeding nozzles and said plurality of second feeding nozzles are aligned along a predefined direction and are arranged according to a first nozzle-second nozzle sequence.

5. The apparatus according to claim 1, wherein said connecting assembly comprises a plurality of said outlet nozzles.

6. The apparatus according to claim 1, wherein said connecting means are variable between said first configuration, said second configuration, and a third configuration in which said connecting assembly is associated with an outlet assembly for the unloading of the residual powder in a switch between said first configuration and said second configuration and vice versa.

7. The apparatus according to claim 2, wherein said connecting assembly comprises a plurality of said outlet nozzles.

8. The apparatus according to claim 4, wherein:

said connecting assembly comprises a plurality of said outlet nozzles; and said plurality of connecting nozzles and said plurality of said outlet nozzles are aligned along a direction parallel to said predefined direction and arranged according to an outlet nozzle-connecting nozzle sequence.

9. The apparatus according to claim 4, wherein:

said connecting assembly comprises at least an outlet nozzle communicating with valve means adapted to receive and blow compressed air into said outlet nozzle, in said first configuration said outlet nozzle being coupled to said second feeding nozzle and in said second configuration said outlet nozzle being coupled to said first feeding nozzle;

said connecting assembly comprises a plurality of said outlet nozzles; and said plurality of connecting nozzles and said plurality of said outlet nozzles are aligned along a direction parallel to said predefined direction and arranged according to an outlet nozzle-connecting nozzle sequence.

* * * * *